(12) United States Patent
Hersonski et al.

(10) Patent No.: US 11,851,000 B2
(45) Date of Patent: Dec. 26, 2023

(54) LIGHTING DEVICE FOR THE INTERIOR OF A MOTOR VEHICLE

(71) Applicant: Bayerische Motoren Werke Aktiengesellschaft, Munich (DE)

(72) Inventors: Alexander Hersonski, Munich (DE); Sebastian Maria Kroes, Munich (DE); Matthias Lindner, Graefelfing (DE); Thomas Scherzinger, Groebenzell (DE); Gregor Walla, Munich (DE); Carsten Wuenderlich, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/908,008

(22) PCT Filed: May 3, 2021

(86) PCT No.: PCT/EP2021/061522
§ 371 (c)(1),
(2) Date: Aug. 30, 2022

(87) PCT Pub. No.: WO2021/228597
PCT Pub. Date: Nov. 18, 2021

(65) Prior Publication Data
US 2023/0099228 A1    Mar. 30, 2023

(30) Foreign Application Priority Data

May 15, 2020    (DE) ...................... 10 2020 113 177.1

(51) Int. Cl.
*B60Q 3/60*    (2017.01)
*B60Q 3/74*    (2017.01)

(52) U.S. Cl.
CPC ................. *B60Q 3/60* (2017.02); *B60Q 3/74* (2017.02)

(58) Field of Classification Search
CPC .................................... B60Q 3/60; B60Q 3/74
See application file for complete search history.

(56) References Cited

U.S. PATENT DOCUMENTS

2005/0006566 A1    1/2005    Maeda
2005/0141213 A1    6/2005    Gasquet
(Continued)

FOREIGN PATENT DOCUMENTS

CN    201151365 Y    11/2008
CN    209719406 U    12/2019
(Continued)

OTHER PUBLICATIONS

International Search Report (PCT/ISA/210) issued in PCT Application No. PCT/EP2021/061522 dated Jun. 23, 2021 with English translation (six (6) pages).
(Continued)

*Primary Examiner* — Joseph L Williams
(74) *Attorney, Agent, or Firm* — Crowell & Moring LLP

(57) ABSTRACT

A lighting device includes a facet body, the interior of which is translucent and which includes a surface made of a plurality of flat facets. The facet body is arranged on an opening formed in a cover that outwardly delimits an inner region of the lighting device. The surface of the facet body includes a first surface section and a second surface section, the first surface section is outwardly exposed via the opening and is translucent, and the second surface section lies in the inner region and has a reflective layer with the exception of one or more translucent surface regions. A plurality of light sources are arranged in the inner region such that the light sources emit light into the facet body via the translucent surface region(s) of the second surface section.

19 Claims, 2 Drawing Sheets

(56) References Cited

U.S. PATENT DOCUMENTS

2013/0258697 A1    10/2013  Suzuki
2014/0268816 A1     9/2014  Ricci
2019/0241121 A1     8/2019  Golgiri et al.

FOREIGN PATENT DOCUMENTS

| DE | 60 2004 004 490 T2 | 1/2008 |
| DE | 10 2018 202 127 A1 | 10/2018 |
| DE | 10 2017 128 896 A1 | 6/2019 |
| EP | 3 318 446 A1 | 5/2018 |
| FR | 3 025 021 A1 | 2/2016 |
| TW | M272037 U | 8/2005 |

OTHER PUBLICATIONS

German-language Written Opinion (PCT/ISA/237) issued in PCT Application No. PCT/EP2021/061522 dated Jun. 23, 2021 (seven (7) pages).

German-language Search Report issued in German Application No. 10 2020 113 177.1 dated Nov. 26, 2020 with partial English translation (13 pages).

LIGHTING DEVICE FOR THE INTERIOR OF A MOTOR VEHICLE

BACKGROUND AND SUMMARY OF THE INVENTION

The invention relates to a lighting device for the interior of a motor vehicle.

Many different types of lighting devices for the interior of a motor vehicle are known from the prior art. For example, there are ambient interior lamps which emit light into the passenger compartment via a light guide and the color and brightness of which can optionally be modified. There are likewise directly emitting interior lamps, which are used for example as reading lamps and often contain one or more LEDs as light sources.

Printed publication DE 10 2018 202 127 A1 describes a lighting device for generating ambient light in the interior of a motor vehicle, which comprises a flat light-scattering element that is illuminated by way of light-emitting diodes. In this case, either the light entry face or the light exit face of the light-scattering element is a surface having a crystal-like structure.

It is an object of the invention to provide a lighting device for the interior of a motor vehicle, which generates a new type of light distribution on a surface in the interior in a straightforward way.

This object is achieved by the claimed invention.

The lighting device according to embodiments of the invention is intended for the interior of a motor vehicle, the motor vehicle being in particular an automobile and optionally also a truck. When interactions between the lighting device and the motor vehicle, or component parts of the motor vehicle, are described below, this is always intended to mean that the interaction takes place when the lighting device is arranged or installed in the motor vehicle. Those component parts of the lighting device which have a corresponding interaction with the motor vehicle, or with components of the motor vehicle, are therefore configured in such a way that the interaction is brought about when the lighting device is arranged or installed in the motor vehicle.

The lighting device according to an embodiment of the invention comprises a faceted body, the interior of which is translucent. Here and in what follows, light is be understood as electromagnetic radiation in the visible wavelength spectrum. The interior of the faceted body is to be understood as the entire faceted body with the exception of any layer on its surface. Furthermore, the term "translucent" is intended to mean that the corresponding material, i.e. the material of the faceted body or of the first surface section described below or of the surface regions described below of the second surface section, is translucent for at least a part of the light impinging on it. Preferably, the material has a transmittance of more than 50%, and in particular more than 90%.

The faceted body installed in the lighting device comprises a surface consisting of a plurality of plane facets. Preferably, the entire surface of the faceted body is formed from such plane facets. The material of the faceted body may be selected differently. In one preferred variant, the faceted body consists of glass, and in particular crystal glass. In this case, the plane facets are preferably ground facets. Nevertheless, the faceted body may also consist at least partly of a different material, and optionally even entirely of a material other than glass, for example a plastic.

The faceted body is arranged in the lighting device according to an embodiment of the invention on an opening having a circumferential opening edge, the opening being formed in a cover which delimits the inner region (i.e. the interior) of the lighting device externally, i.e. from the interior of the motor vehicle. The surface of the faceted body comprises a first surface section and a second surface section. Preferably, the surface of the faceted body is formed exclusively from the first and second surface sections. The first surface section is exposed through the opening provided in the cover externally, i.e. toward the interior of the motor vehicle, and is translucent, while the second surface section lies in the inner region of the lighting device and, except for one or more translucent surface regions, comprises a reflection layer which is reflective toward the interior of the transparent body. A reflection layer is in this case to be understood as an optically opaque layer which reflects at least a part of the light impinging on it. Preferably, the reflectance of the layer is 50% or more, and a particular 90% or more.

A number of light sources (i.e. one or more light sources) are arranged in the interior of the lighting device in such a way that, during operation, they emit light through the translucent surface region or regions of the second surface section into the faceted body, at least a part of the emitted light being guided out from the faceted body by reflection at the reflection layer of the second surface section and refraction at the facets of the first surface section. In this way, when the lighting device is installed in the motor vehicle, a light distribution is generated on a surface in the interior of the latter. Preferably, for each translucent surface region, an individual light source which emits into this surface region is provided.

The lighting device according to an embodiment of the invention has the advantage that, with a suitable faceted body, it can generate an appealing light distribution in a straightforward way by way of light reflection and light refraction at corresponding facets.

In one preferred configuration, a respective light source of at least some of the number of light sources is arranged next to the opening edge of the corresponding opening in the cover. Preferably, each light source present is positioned next to this opening edge. In this way, a compact structure of the lighting device is achieved. Here and in what follows, the term "at least some of the number of light sources" refers to a single light source if there is only one light source in the lighting device, or at least one light source if a plurality of light sources are installed in the lighting device.

In another preferred configuration, a respective light source of at least some of the number of light sources, and in particular each light source present, emits in a main beam direction which is parallel to an opening plane or extends away from the opening plane. An opening plane is in this case to be understood as the plane delimited by the opening edge of the opening. This implies that the opening edge is configured in such a way that a plane surface is thereby delimited. The main beam direction refers to the direction of the light emission with the highest intensity. With this variant of the invention, the light of the light sources which are present is used particularly efficiently for generating the light distribution.

In another preferred embodiment, the second surface section comprises a subregion which extends around the faceted body and which adjoins the first surface section, and in which the facets extend at an angle of inclination of between 60° and 120° with respect to the opening plane, and preferably at least in part substantially perpendicularly to the opening plane. According to the definition above, the opening plane is again the plane delimited by the opening edge. The angle of inclination is in this case defined such that it points toward the opening starting from the respective facet exclusively in the inner region of the lighting device. The circumferential subregion is furthermore distinguished in that it contains the translucent surface region or regions of the second surface section.

In another preferred variant, the subregion extending around the faceted body is adjoined by a further subregion of the second surface section, having facets which extend at an angle of inclination of less than 90°, preferably at an angle of inclination of 45° or less, and/or parallel to the opening plane. An angle of inclination is again to be understood in that it points toward the opening starting from the respective facet exclusively in the inner region. With this variant, a compact structure of the faceted body can be achieved.

In another embodiment, a respective light source of at least some of the number of light sources, and in particular each light source present, is assigned an optical unit which collimates the light of the respective light source at least partially in a direction which extends parallel to the opening plane or away from the opening plane, the opening plane again being the plane delimited by the opening edge of the opening. With this variant, efficient emission of light with low light losses into the faceted body can be achieved. The optical unit may in this case be configured differently, and preferably comprises one or more lenses which collimate the light.

In another preferred configuration, the first surface section of the faceted body protrudes outward from the opening, i.e. toward the interior of the motor vehicle. In this case, the first surface section is preferably configured in the shape of a dome. In this way, visually particularly appealing light effects can be achieved by way of the light distribution generated.

The light sources installed in the lighting device according to embodiments of the invention may be configured differently. In one preferred embodiment, the number of light sources comprise one or more LEDs and/or one or more laser diodes, so that a compact structure of the lighting device is achieved.

In another variant of the lighting device according to the invention, a respective light source of at least some of the number of light sources, and in particular each light source present, is configured in such a way that its brightness and/or light color is variable. This may for example be achieved with an RGB LED or an RGBW LED, which contains a plurality of light-emitting diodes of different color, the brightness and the color mixing of the light generated being variable by a corresponding control of the individual light-emitting diodes.

In one preferred variant of the embodiment just described, the lighting device is configured in such a way that it can be operated in one or more dynamic operating modes, the brightness and/or the light color of at least one light source, and optionally also a plurality of light sources, of the number of light sources being varied in a respective dynamic operating mode. In this way, a light effect in the form of a time-varying light distribution can be achieved. As an alternative or in addition to the dynamic operating mode or modes, the lighting device may optionally also be operated in one or more stationary operating modes, the brightness and light color of the number of light sources being invariant in a respective stationary operating mode.

In another preferred variant, the lighting device according to the invention is configured in such a way that the dynamic operating mode or modes and/or the stationary operating mode or modes are respectively initiated by an operating event of the motor vehicle and/or are coupled to an operating state of the motor vehicle. For example, a corresponding operating mode may be initiated by the motor vehicle being unlocked or by a passenger door of the motor vehicle being opened. In this way, an appealing welcome scenario for the driver of the motor vehicle can be generated in the passenger compartment, the welcome scenario also being visible from outside the motor vehicle.

In another configuration, a dynamic operating mode may, for example, be coupled to the operating state of playing music by way of an audio system in the interior of the motor vehicle, the brightness or color of the light preferably being varied in time with the music. A dynamic operating mode may also be coupled to electrical charging of the motor vehicle. In this case, the electrical charging may for example be displayed by pulsation of the light distribution generated.

The lighting device according to embodiments of the invention may be installed at any desired positions in the interior of the motor vehicle. In one variant, the lighting device is intended for installation in the central console in the interior of the motor vehicle. Preferably, the lighting device in this case generates a light distribution on the roof liner. Nevertheless, the lighting device may also be provided at other positions in the motor vehicle, for example at a position in the vehicle passenger compartment outside the central console or in the inner door panel or in the back panel of a passenger seat, or optionally also in the roof liner.

Besides the lighting device described above, the invention relates to a motor vehicle which contains one or more lighting devices according to embodiments of the invention or one or more preferred variants of the lighting device according to the invention in its interior.

An exemplary embodiment of the invention will be described in detail below with the aid of the appended figures.

DETAILED DESCRIPTION OF THE DRAWINGS

Figure 1:
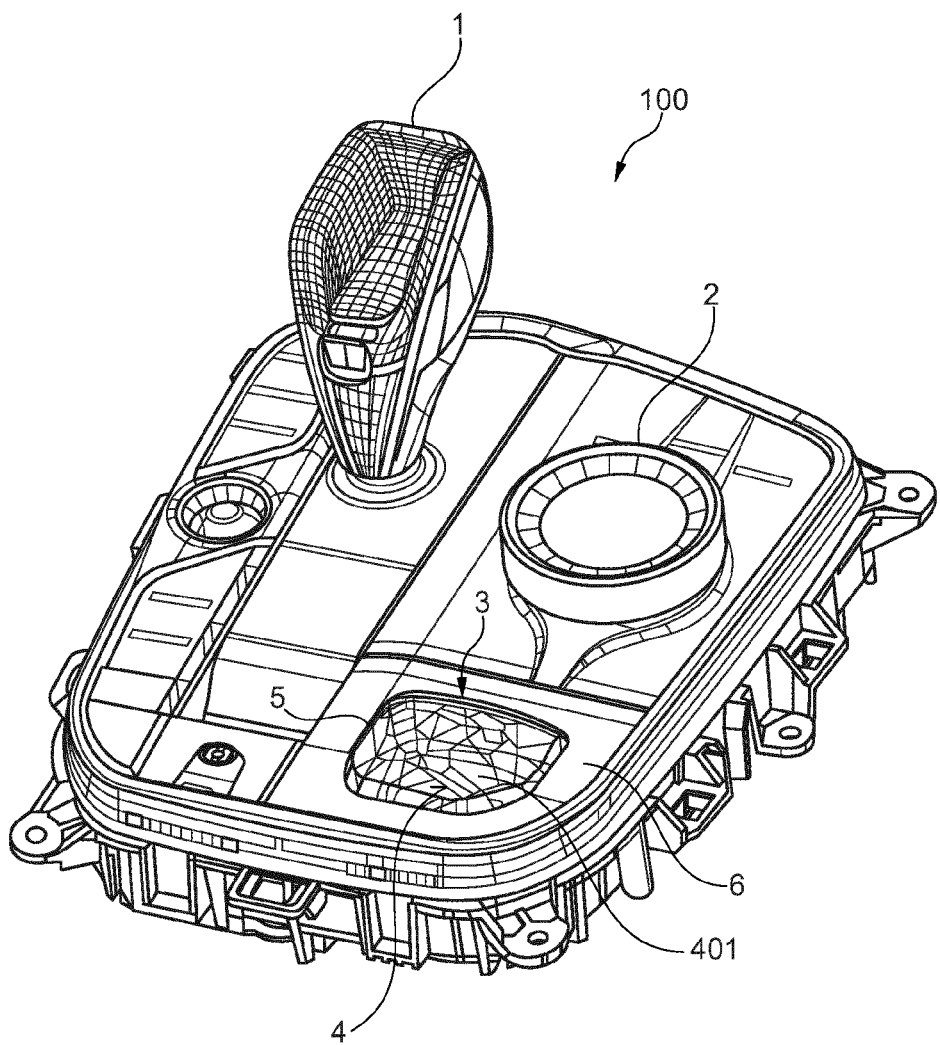
FIG. 1 shows a perspective representation of a part of a central console in a motor vehicle, with an embodiment of a lighting device according to the invention integrated therein.

An embodiment of the invention will be described below with the aid of a lighting device for the passenger compartment of a motor vehicle, which is integrated in the central console of the motor vehicle. FIG. 1 in this case shows a perspective representation of a section of the central console 100, which is arranged between the driver's seat and the front passenger's seat.

In a manner known per se, the central console 100 comprises a gearshift or gear selection lever 1, by way of which the driver can select the corresponding transmission gear. On the right next to the gear selection lever, there is a twist/press controller 2, which is often also referred to as an iDrive® controller. This twist/press controller is a cylindrical knob which can be tilted, and the lateral surface of which can be rotated, in order to input corresponding operating actions for controlling the vehicle. The upper side of the knob is furthermore touch-sensitive, by way of which corresponding operating commands can also be input. Such a twist/press controller is known per se and will not therefore be described in more detail. Provided in the represented detail of the central console 100, there are further operating elements in the form of buttons and levers, which are not relevant for the invention and will therefore not be explained further.

Installed in the lower right part of the represented detail of the central console 100, there is a variant of a lighting device according to the invention, which is denoted overall by reference 3. The lighting device 3 comprises a cover 6 on the upper side, so that the interior of a housing section is covered. This housing section can be seen from FIG. 2, where it is denoted by reference numeral 8. The cover 6 contains an opening 5 having a circumferential opening edge. A dome-shaped transparent surface section 401 of a faceted body 4 projects from this opening 5.

The faceted body 4 is an essential component of the lighting device according to an embodiment of the invention. It is a body which is formed from a translucent material, for example glass or transparent plastic, and the entire surface of which consists of a plurality of plane facets, at least some of which are denoted by reference numeral 7 in FIG. 2. In the case of a glass body, the facets are preferably ground facets, i.e. they have been formed by surface grinding in the glass body. In this case, the glass body preferably consists of crystal glass.

Figure 2:
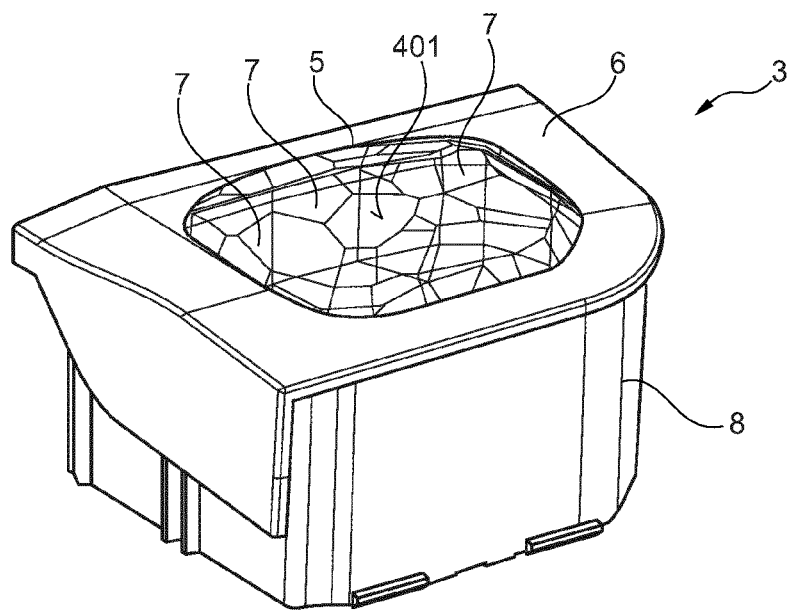
FIG. 2 shows a perspective detail representation of the lighting device of FIG. 1.

FIG. 2 again shows a perspective detail view of the lighting device 3 of FIG. 1. As already mentioned, FIG. 2 shows a housing section 8 which is fitted into the central console 100 of the motor vehicle and comprises a circumferential housing wall and a bottom. On the upper side of the housing section, there is the cover 6 which comprises the opening 5 with a corresponding opening edge. The dome-shaped surface section 401, which will also be referred to below as a first surface section in analogy with the patent claims, projects from this opening.

Figure 3:
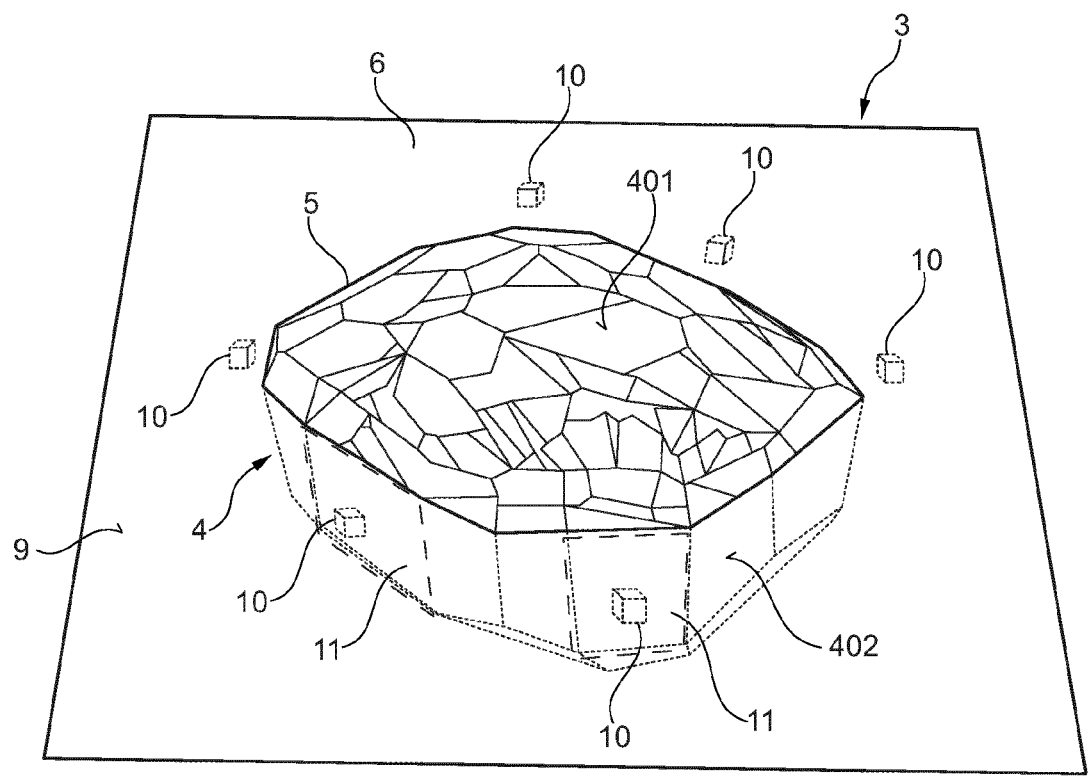
FIG. 3 shows a schematic perspective representation of the lighting device of FIG. 2, from which the interior of the lighting device can be seen.

The interior of the lighting device 3 can be seen from the perspective representation of FIG. 3. There, the cover 6 is schematically depicted as a surface, which is represented as being transparent in order to allow a view of the interior of the housing section 8, or of the lighting device 3. In fact, the cover 6 consists of an optically opaque material. The interior, or the inner region, of the lighting device is denoted in FIG. 3 by reference numeral 9. As can be seen, the first surface region 401 is adjoined by a second surface region 402, which protrudes downward from the opening edge of the opening 5 and lies entirely in the inner region 9. The surface section 402 will also be referred to below as a second surface section by analogy with the patent claims. Except for transparent windows 11, this second surface section is provided with a reflective coating by which light rays are prevented from entering the interior of the faceted body 4 and light radiation is furthermore reflected in the interior of the faceted body.

Arranged around the surface section 402, there are a total of six light sources 10 in the form of RGBW LEDs, which emit toward the faceted body and the brightness and color mixings of which can each be varied separately by a corresponding controller. The RGBW LEDs are indicated only schematically as blocks. Each LED lies on a transparent window or transparent opening region 11 in the surface section 402, only two of these transparent windows being visible in FIG. 3 and highlighted by a dashed border. The six transparent windows are formed in a circumferential subsection of the surface section 402, this subsection being located next to the opening edge of the opening 5. This subsection is adjoined downward by a further subsection of the surface region 402, in which the facets extend at a shallow angle or parallel to the surface of the cover 6 and therefore close the faceted body downward.

Through each individual window 11, the LED 10 arranged there can emit light into the faceted body 4. This light is partially reflected at the reflective coating of the second surface section 402, and partially emerges from the faceted body 4 by light refraction at the transparent facets 7 of the first surface section 401. In this way, a light distribution is generated on the roof liner in the passenger compartment of the corresponding motor vehicle. This light distribution is visually very appealing because of the plurality of reflections and refractions.

In one preferred configuration, the lighting device 3 can be operated in a dynamic operating mode in which the color and brightness of the individual LEDs is varied over a particular period of time. In this way, the effect of a light distribution varying as a function of time can be generated on the roof liner of the motor vehicle. The generation of such a dynamic light distribution may, depending on the configuration, be coupled to various operating events. For example, the dynamic light distribution may be generated as a welcome scenario when unlocking the motor vehicle, or when opening a passenger door. Likewise, the generation of the dynamic light distribution may be dependent on operating states of the motor vehicle. For example, the dynamic light distribution may vary its brightness and color in time with the music when music is played through an audio system in the motor vehicle. Furthermore, the light distribution may for example generate a pulsating image on the roof liner, which is displayed during electrical charging of the motor vehicle and therefore indicates the charging process currently being carried out.

The above-described embodiments of the invention have a number of advantages. In particular, an appealing light distribution can be generated in the interior of a motor vehicle in a straightforward way by way of a faceted body into which light is emitted from one or more light sources. Optionally, a dynamic lighting effect may in this case be achieved by varying the brightness and color mixing of the light sources. The lighting device is simply constructed and can readily be installed at any desired positions in the interior of the motor vehicle, for example in the central console or at another position in the vehicle passenger compartment. In particular, the lighting device may also be integrated in the inner door panel or in the back panel of a passenger seat, or optionally also in the roof liner.

LIST OF REFERENCES 100 central console
1 gearshift
2 twist/press controller
3 lighting device
4 faceted body
401 first surface section of the faceted body
402 second surface section of the faceted body
5 opening
6 cover
7 facets
8 housing section
9 inner region of the lighting device
10 light sources
11 transparent surface regions

The invention claimed is:

1. A lighting device for an interior of a motor vehicle, the lighting device comprising:
a faceted body, an interior of which is translucent and which comprises a surface consisting of a plurality of plane facets, wherein:
the faceted body is arranged on an opening having a circumferential opening edge,
the opening is formed in a cover which externally delimits an inner region of the lighting device,
the surface of the faceted body comprises a first surface section and a second surface section,
the first surface section is exposed through the opening externally and is translucent,
the second surface section lies in the inner region of the lighting device and, except for one or more translucent surface regions, comprises a reflection layer which is reflective toward the interior of the faceted body, and
a plurality of light sources are arranged in the inner region of the lighting device such that, during operation, the light sources emit light through the one or more translucent surface regions of the second surface section into the faceted body, and at least a part of the emitted light is guided out from the faceted body by reflection at the reflection layer of the second surface section and refraction at the facets of the first surface section, so that a light distribution is generated on a surface in the interior of the motor vehicle.

2. The lighting device according to claim 1, wherein a respective light source of the plurality of light sources is arranged next to the opening edge.

3. The lighting device according to claim 1, wherein:
a respective light source of the plurality of light sources emits light in a main beam direction which is parallel to an opening plane or extends away from the opening plane, and
the opening plane is a plane delimited by the opening edge.

4. The lighting device according to claim 1, wherein:
the second surface section comprises a subregion which extends around the faceted body and which adjoins the first surface section, and in which the facets extend at an angle of inclination of between 60° and 120° with respect to an opening plane,
the subregion which extends around the faceted body contains the translucent surface region or regions, and
the opening plane is a plane delimited by the opening edge and the angle of inclination pointing toward the opening starting from the respective facet exclusively in the inner region.

5. The lighting device according to claim 4, wherein at least some of the facets extend substantially perpendicularly to the opening plane.

6. The lighting device according to claim 4, wherein the subregion which extends around the faceted body is adjoined by a further subregion of the second surface section, having facets which extend at an angle of inclination of less than 90° and/or parallel to the opening plane.

7. The lighting device according to claim 6, wherein the angle of inclination is 45° or less.

8. The lighting device according to claim 1, wherein:
a respective light source of the plurality of light sources is assigned an optical unit which collimates the light of the respective light source at least partially in a direction which extends parallel to an opening plane or away from the opening plane, and
the opening plane is a plane delimited by the opening edge of the opening.

9. The lighting device according to claim 1, wherein the first surface section of the faceted body protrudes outward from the opening.

10. The lighting device according to claim 9, wherein the first surface section of the facet body is configured in a shape of a dome.

11. The lighting device according to claim 1, wherein the faceted body is formed from glass and/or plastic.

12. The lighting device according to claim 1, wherein the plurality of light sources comprise one or more LEDs and/or one or more laser diodes.

13. The lighting device according to claim 1, wherein a respective light source of the plurality of light sources is configured such that a brightness and/or a light color of the respective light source is variable.

14. The lighting device according to claim 13, wherein:
the lighting device is operable in one or more dynamic operating modes, and
the brightness and/or the light color of the respective light source is varied in a respective dynamic operating mode of the one or more dynamic operating modes.

15. The lighting device according to claim 14, wherein the lighting device is configured such that the one or more dynamic operating modes are initiated by an operating event of the motor vehicle and/or are coupled to an operating state of the motor vehicle.

16. The lighting device according to claim 1, wherein:
the lighting device is operable in one or more stationary operating modes, and
a brightness and a light color of the plurality of light sources are invariant in a respective stationary operating mode of the one or more stationary operating modes.

17. The lighting device according to claim 16, wherein the lighting device is configured such that the one or more stationary operating modes are initiated by an operating event of the motor vehicle and/or are coupled to an operating state of the motor vehicle.

18. The lighting device according to claim 1, wherein the lighting device is configured for installation in a central console in the interior of the motor vehicle.

19. A motor vehicle comprising one or more lighting devices according to claim 1, wherein the one or more lighting devices are arranged in the interior of the motor vehicle.

* * * * *